United States Patent Office 3,503,822
Patented Mar. 31, 1970

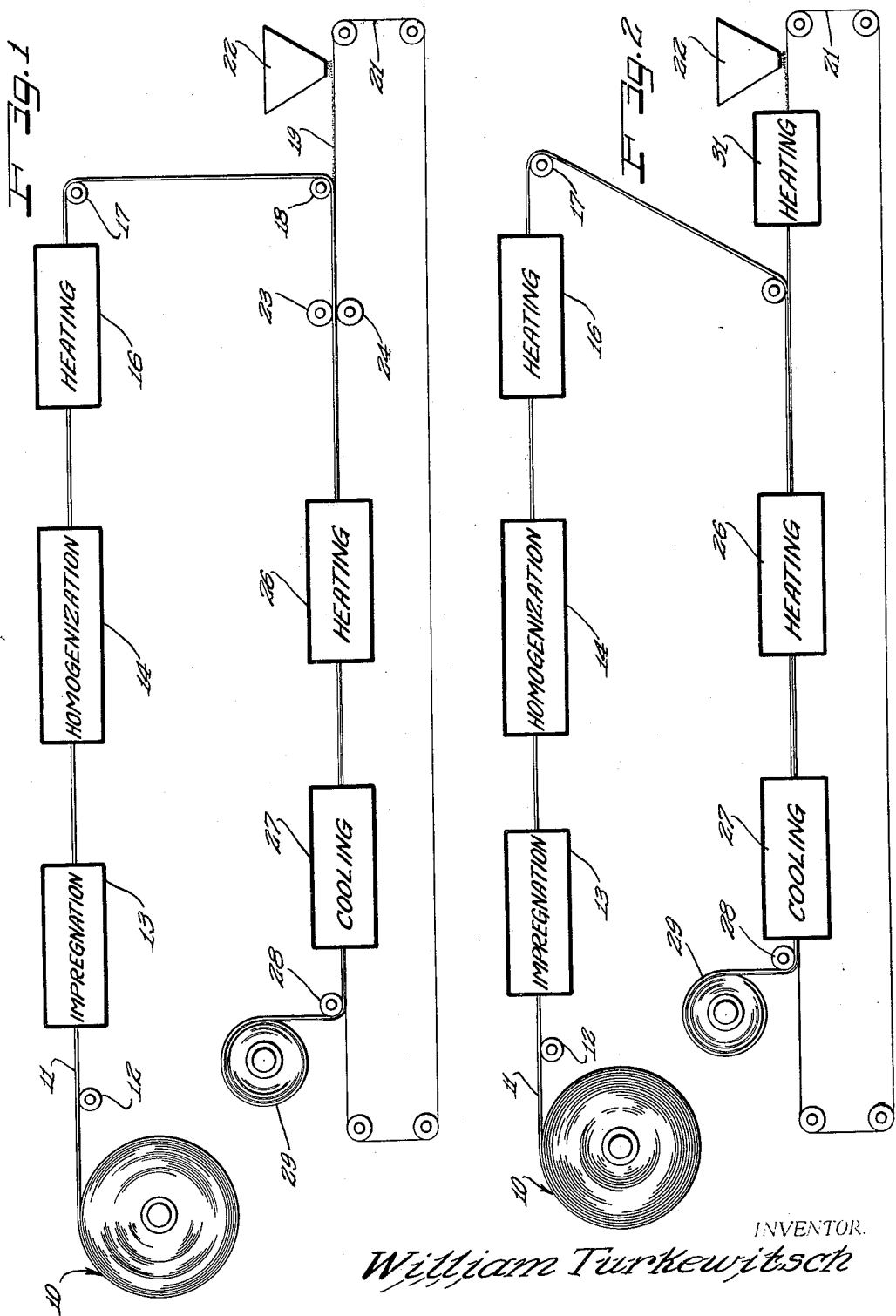

3,503,822
RESIN IMPREGNATING OF FOAMED
POLYURETHANE
William Turkewitsch, Toronto, Canada, assignor to The
Scholl Mfg. Co., Inc., Chicago, Ill., a corporation of
New York
Filed Dec. 20, 1965, Ser. No. 515,044
Int. Cl. B29b 3/00; B44d 1/44, 1/22
U.S. Cl. 156—242           5 Claims

ABSTRACT OF THE DISCLOSURE

An open celled polyurethane foam is impregnated with a gellable dispersion of a thermoplastic resin, the dispersion is gelled within the interstices of the foam. A dispersion of a thermoplastic resin is applied onto the impregnated foam. Then fusing and cooling the impregnant and said layer so as to provide a continuous wear resistant layer of thermoplastic resin securely bonded to the foam.

The present invention relates to an improved foam product having a wear resistant surface.

Heat sealable foams based upon vinyl polymers have been developed and are quite satisfactory in their field. However, their cost is sufficiently high that it has limited their use in applications where foams having their properties would otherwise be useful.

Polyurethane foams are considerably less expensive than vinyl foams, but they are inherently non-heat sealable. These foams have little strength, and their resistance to abrasion and wear is not particularly high. While some attempts have been made to laminate such polyurethane foams to materials having better wear properties, these attempts have not always been successful because of the difficulty in securing good adhesion between a thermoplastic film or sheet and the porous, inert underlying polyurethane foam layer.

One of the objects of the present invention is to provide an improved polyurethane foam structure having an overlying skin or layer of a thermoplastic resin integrally bonded thereto, the strength of the joint exceeding the tensile strength of the polyurethane foam.

Another object of the invention is to provide an improved wear resistant surface for a polyurethane foam structure which may employ considerably lighter foams than have heretofore been used.

Still another object of the invention is to provide a method for making polyurethane foams heat sealable without substantially increasing the cost.

Another object of the invention is to provide an improved method for integrally joining a thermoplastic resin layer to a polyurethane foam without damaging the cellular structure of the foam.

Still another object of the invention is to provide an improved method for applying a thermoplastic resin layer onto a polyurethane foam in a continuous process.

The wear resistant polyurethane foam structures of the present invention find use in a wide variety of fields. One of the biggest markets for such foam is that of automotive seating. Other fields in which such foam would be useful include foot insoles, armrests, and cushioning devices generally.

The chemistry of the polyurethane foam is not a matter of significance for the purposes of the present invention. Any polyurethane foam, i.e., one containing urethane linkages can be employed. These materials are formed by the reaction of an isocyanate with a compound containing hydroxyl groups. Polyurethane foams presently available commercially are usually of the ether or ester types. The ether type can be made normally open celled, while the ester type foam is produced as essentially a closed cell product. Ester foams can be made open celled or reticulated mechanically, by chemical treatment, or by ignition of a combustible gas mixture within the body of the foam.

One of the features of the present invention resides in the fact that extremely lightweight polyurethane foams can be made heat sealable. I have made foam structures having a density of not more than 3 pounds per cubic foot, and generally in the range from 2.5 to 3 pounds per cubic foot. This lightweight is a great advantage over conventional vinyl type foams which have a density on the order of 5.5 to 8 pounds per cubic foot, or the even heavier expanded vinyl foams which have a density in the range from about 12 to 60 pounds per cubic foot.

In accordance with the present invention, the open celled polyurethane foam is first impregnated with a dispersion of a thermoplastic resin, and treated so that the resin dispersion thoroughly permeates the naturally porous foam structure. Then, a layer of a dispersion of a thermoplastic resin compatible with the resin of the impregnant (and usually identical to the resinous impregnant) is applied over the impregnated foam, whereupon the impregnant and the coherent overlying layer are jointly fused to provide a wear resistant layer of thermoplastic resin securely bonded to the foam by its merger with the resin of the impregnant.

While aqueous emulsions or latices of the thermoplastic resin can be used to provide the wear resistant layer, I particularly prefer to use the type of dispersion which is known in the synthetic resin field as a plastisol. These materials are combinations of a thermoplastic resin and sufficient amounts of a plasticizer to make the resin heat gellable. When a plastisol is heated, the plasticizer solvates the resin particles and the mass gels. Continued application of heat causes fusion of the gelled material so that upon cooling, a continuous thermoplastic layer results.

The resinous component of the plastisol can be any ethyenically unsaturated polymer which is capable of being solvated by the plasticizer present. As a partial list of suitable resinous components for such plastisols, I may mention polymerized vinyl compounds such as polyvinyl chloride, polyvinyl dichloride, polyvinyl acetate, polyvinylidene chloride, acrylic acid, acrylic esters, and homologues, the foregoing polymers being present in the form of homopolymers or copolymers of high molecular weight.

The plasticizers used in connection with such plastisols included a wide variety of chemical families including the adipates, phthalates, phosphates, and polymerized non-migrating plasticizers such as "Plastolein" consisting of esters and polyesters of azelaic and pelargonic acids. Another suitable polymeric plasticizer is known commercially as "Paraplex," consisting of high and intermediate molecular weight polymeric polyesters. Suitable phthalate plasticizers include dioctyl phthalate, didecyl phthalate, butyl benzyl phthalate, dicapryl phthalate, and the like. A typical adipate plasticizer is didecyl adipate. Still another suitable plasticizer is dipropylene glycol dibenzoate. All of these plasticizers are well known for use in plastisol compositions and the selection of a suitable plasticizer does not form a part of the present invention. Similarly, plastisol compositions frequently contain mineral fillers and stabilizers all dispersed in the plastisol, as is well known in the art.

The process involved in producing the improved wear resistant foam compositions of the present invention is capable of substantial variation. The presently preferred procedure consists in impregnating the foam with a plastisol of the thermoplastic resin, applying a layer of the same or different (but compatible) plastisol over the impregnated foam, and then jointly and simultaneously gelling the two plastisol compositions, and finally fusing the two jointly to produce a foam structure having an overlying layer of a solid thermoplastic resin integrally bonded and interlocked with the foam structure by virtue of the merger of the two plastisol compositions.

As an alternative procedure, the continuous film of the plastisol which is to form the wear resisting layer may be partly gelled and then brought into contact with the impregnated foam, followed by a heat treatment which causes fusion and bonding of the two plastisol compositions.

Another variation consists in forming a continuous layer of the plastisol, followed by gellation and partial fusion of the layer. Then, the layer is applied to the impregnated foam, followed by the completion of fusion to form the bond between the overlying layer and the foam.

Still another variation consists in slightly gelling the impregnant contained in the foam, and then bringing it into contact with the plastisol layer so that the two plastisol compositions can then be jointly fused. This method can be used with the plastisol layer either non-gelled, partly gelled, or completely gelled and partly fused.

The temperature of gellation and fusion will vary, depending upon the composition employed. Generally, for most plastisol compositions, heat treatment temperatures in the range between 265° F. and 360° F. are sufficient to complete the gellation and cause fusion of the plastisol constituents.

A further description of the present invention will be made in conjunction with the attached sheet of drawings in which:

FIGURE 1 is a partially schematic showing of an apparatus for producing the improved foam product of the present invention; and FIGURE 2 is a view similar to FIGURE 1, but illustrating a modified form of the invention.

As shown in the drawings:

In FIGURE 1, reference numeral 10 indicates generally a roll of open celled polyurethane foam as received from the manufacturer. A continuous strip 11 of the foam after passing over a tensioning roller 12 is passed to an impregnation zone generally indicated at reference numeral 13 in the drawings. In the impregnation zone 13, a dispersion of the thermoplastic resin, such as a plastisol is applied to the foam by spreading, dipping, spraying, or other means. After the initial impregnation in the zone 13, the strip 11 moves to a zone 14 which has been labeled a homogenization zone where the plastisol is worked into the pores of the strip 11. This may be done by mechanical kneading, by the application of a vacuum to draw the material into the pores, by the application of pressure, by the application of centrifugal force, or other means. If the impregnant is to be at least partly gelled prior to the application of the overlying thermoplastic layer, the impregnated strip then passes through a heating zone generally indicated at numeral 16 of the drawings.

The strip 11 then passes over a pair of rollers 17 and 18 and is pressed against a layer or film 19 of a plastisol which may be identical to the impregnant, or at least compatible with it. The plastisol is applied as a continuous film onto a moving belt 21 by means of a suitable applicator generally indicated at reference numeral 22 in the drawings. The belt 21 may be made of a suitable release material such as polytetrafluoroethylene, stainless steel, aluminum, paper, or the like. For decorative effects, the surface of the belt 21 may be provided with a pattern which is then embossed into the layer 19 during the completion of the process.

The impregnated foam strip 11 and the plastisol layer 19 may be initially pressed together by means of a pair of cooperating pressure rolls 23 and 24. Then, the consolidated mass is passed to a heating zone 26 where, in the preferred form of the invention, the plastisol is heated to a temperature sufficiently high to cause gellation, followed by fusion. The resulting laminated structure is then passed through a cooling means 27 where the previously fused mass is completely solidified, causing the plastisol layer 19 to set to a flexible but tough film, which film is bonded to the foam by its merger with the impregnant. After passage under a roll 28, the product may be wound up on a roll 29.

In the form of the invention illustrated in FIGURE 2, the impregnation, homogenization, and heating steps identified at zones 13, 14 and 16 are the same, except that the plastisol film 19 is pre-gelled, or pre-gelled and partly fused by passage through a heating zone 31 before being combined with the impregnated strip 11. The strip is then combined with an impregnated foam and passed through the heating zone 26 where fusion is completed.

The following specific examples illustrate the process of the present invention in several embodiments.

EXAMPLE I

A polyurethane ether foam having a density of 1.5 pounds per cubic foot was impregnated with a suitably dispersed mixture having the following composition:

| | Parts by weight |
|---|---|
| Polyvinyl chloride resin | 35–45 |
| Phthalate plasticizers | 17–22 |
| Polymeric plasticizers | 17–22 |
| Mineral fillers | 10–20 |
| Barium-cadmium-zinc stabilizer | 1–1.5 |

The impregnant was applied in a quantity of 1.0 pounds per cubic foot. A layer of 0.020 inch thickness of the same plastisol composition was laid over the impregnated foam, after homogenization, whereupon the two were gelled and fused together at a temperature of 350° F. This material was completely flexible, evidenced an extremely strong bond between the foam and the overlying layer, and could be electronically heat sealed.

EXAMPLE II

A polyurethane ester foam which has been reticulated chemically and which had a density of 1.7 pounds per cubic foot was impregnated with a plastisol having the following ranges of composition:

| | Parts |
|---|---|
| Polyvinyl chloride resin | 35–45 |
| Polyvinyl chloride-acetate copolymer | 6–8 |
| Phthalate plasticizer | 25–35 |
| Polymeric plasticizer | 6–8 |
| Barium-cadmium-zinc stabilizer | 1–1.5 |
| Mineral filler | 5–15 |
| Color pigment | 1 |

The plastisol was incorporated into the foam in a quantity of 1.4 pounds per cubic foot. This impregnated foam was then covered with a layer of 0.015 inch thickness of the same plastisol which had been slightly foamed to decrease its density. The combination of the foam and the overlying layer were then gelled and fused together at a temperature of 340° F. to produce a material which could be readily electronically sealed.

EXAMPLE III

A sheet of open celled polyurethane ether foam having a density of 1.4 pounds per cubic foot was impregnated with a mixture having the following range of composition:

| | Parts |
|---|---|
| Polymerized methyl methacrylate | 50–55 |
| Dibutyl phthalate | 30–50 |
| Mineral filler | 1–3 |

The impregnation was carried out to an extent of 1.5 pounds per cubic foot, following which the material was partly gelled in the pores by heat. A layer of approximately 0.015 inch of the above mixture was applied over the impregnated foam, and gelling and fusion of the materials were completed at 270° F. This sample could also be electronically sealed.

EXAMPLE IV

A sheet of polyurethane ether foam having a density of 1.7 pounds per cubic foot was impregnated with a plastisol as in Example I in a quantity of approximately 1.5 pounds per cubic foot. The impregnant was pre-gelled in the urethane foam structure. A layer of approximately 0.015 inch of the mixture of Example III was applied over the impregnated foam, gelled followed by fusion at a temperature of 350° F. This sample was found to be electronically sealable.

EXAMPLE V

An open cell polyurethane ether foam having a density of 1.7 pounds per cubic foot was impregnated with a mixture of Example I in an amount of approximately 1.5 pounds per cubic foot. Then, a layer of a plastisol measuring about 0.012 inch in thickness was applied over the impregnated foam, the plastisol having the following range of composition:

|  | Parts |
|---|---|
| Vinyl chloride-vinylidene copolymer | 80–110 |
| Phthalate plasticizer | 15–25 |
| Polymeric plasticizer | 65–75 |
| Mineral filler | 5–15 |
| Barium-cadmium-zinc stabilizer | 1–2 |

The two plastisol compositions were simultaneously gelled and fused together at 325° F. to produce a flexible foam composition with a wear resistant layer.

EXAMPLE VI

A sheet of open cell polyurethane ether foam having a density of 1.7 pounds per cubic foot was impregnated with a plastisol as described in Example I in a quantity of about 1.5 pounds per cubic foot. Over the impregnated foam, there was applied a layer of approximately 0.012 inch in thickness of a dispersion consisting of:

|  | Parts |
|---|---|
| Vinyl chloride-vinylidene copolymer | 17–22 |
| Polyvinyl chloride resin | 17–22 |
| Phthalate plasticizer | 17–22 |
| Polymeric plasticizer | 17–22 |
| Mineral fillers | 10–20 |
| Barium-cadmium-zinc stabilizer | 1–1.5 |

The impregnated foams on the overlying layer were gelled and fused together at 325° F. to produce a completely acceptable product.

From the foregoing, it will be evident that the process of the present invention produces a highly flexible, soft foam material having a satisfactory drape and "hand," while being heat sealable to other thermoplastic materials.

I claim as my invention:

1. The method of providing a wear resistant layer over an open celled polyruethane foam which comprises impregnating said foam with a gellable dispersion of a thermoplastic resin, at least partially gelling the dispersion within the interstices of the foam, applying a layer of a dispersion of a thermoplastic resin compatible with the resin of the impregnant onto the impregnated foam, fusing the impregnant and said layer, and cooling the fused materials to provide a continuous wear resistant layer of thermoplastic resin securely bonded to said foam.

2. The method of providing a wear resistant layer over an open celled polyurethane foam which comprises impregnating said foam with a polyvinyl resin plastisol, at least partially gelling the plastisol within the interstices of the foam, applying a layer of a polyvinyl resin plastisol onto the impregnated foam, fusing the impregnant and said layer, and cooling the fused materials to provide a continuous wear resistant layer of thermoplastic resin securely bonded to said foam.

3. The method of claim 2 in which the resin impregnant and the resin of said layer are the same.

4. The method of claim 2 in which said layer is gelled but not fused prior to application to the impregnated foam, and said layer is fused subsequent to such application.

5. The method of claim 2 in which said layer is gelled and partly fused prior to application to the impregnated foam, and the fusion of said layer is completed after such application.

References Cited

UNITED STATES PATENTS

| 3,437,551 | 4/1969 | Marshack | 161—160 |
|---|---|---|---|
| 3,393,119 | 7/1968 | Dugan | 161—160 |

WILLIAM J. VAN BALEN, Primary Examiner

U.S. Cl. X.R.

117—67, 72, 98, 138.8